United States Patent
Zhao et al.

(10) Patent No.: US 11,423,228 B2
(45) Date of Patent: Aug. 23, 2022

(54) WEAKLY SUPERVISED SEMANTIC ENTITY RECOGNITION USING GENERAL AND TARGET DOMAIN KNOWLEDGE

(71) Applicant: Robert Bosch GmbH, Stuttgart (DE)

(72) Inventors: Xinyan Zhao, Ann Arbor, MI (US); Haibo Ding, Santa Clara, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 16/844,752

(22) Filed: Apr. 9, 2020

(65) Prior Publication Data

US 2021/0319183 A1    Oct. 14, 2021

(51) Int. Cl.
  *G06F 17/00*   (2019.01)
  *G06F 40/295*  (2020.01)
  *G06F 40/30*   (2020.01)

(52) U.S. Cl.
  CPC ............ *G06F 40/295* (2020.01); *G06F 40/30* (2020.01)

(58) Field of Classification Search
  None
  See application file for complete search history.

(56) References Cited

U.S. PATENT DOCUMENTS

| | | | |
|---|---|---|---|
| 8,725,666 B2 | 5/2014 | Lemmond et al. | |
| 9,792,560 B2 | 10/2017 | Jeong et al. | |
| 10,133,728 B2 | 11/2018 | Poon et al. | |
| 10,169,454 B2 | 1/2019 | Ait-Mokhtar et al. | |
| 10,417,345 B1* | 9/2019 | Carlson | G06F 40/30 |
| 2016/0335544 A1* | 11/2016 | Bretschneider | G06F 16/367 |
| 2017/0024465 A1* | 1/2017 | Yeh | G10L 25/54 |
| 2017/0026705 A1* | 1/2017 | Yeh | H04N 21/4665 |
| 2018/0032900 A1 | 2/2018 | Chowdhury et al. | |
| 2019/0236132 A1 | 8/2019 | Zhu et al. | |

OTHER PUBLICATIONS

Alan Akbik, Duncan Blythe, and Roland Vollgraf. 2018. Contextual string embeddings for sequence labeling. In Proceedings of the 27th International Conference on Computational Linguistics, pp. 1638-1649.
Jason PC Chiu and Eric Nichols. 2015. Named entity recognition with bidirectional lstm-cnns. arXiv preprint arXiv:1511.08308.

(Continued)

*Primary Examiner* — Satwant K Singh
(74) *Attorney, Agent, or Firm* — Michael Best & Friedrich LLP

(57) ABSTRACT

Methods and systems for performing semantic entity recognition. The method includes accessing a document stored in a memory and selecting from a general knowledge data repository, target domain information based on a specified target domain. The method also includes generating a plurality of weak annotators for the document based upon the selected target domain information and expert knowledge from a domain-specific expert knowledge data repository and applying the plurality of weak annotators to the document to generate a plurality of weak labels. The method further includes selecting at least one weak label from the plurality of weak labels as training data and training a semantic entity prediction model using the training data.

20 Claims, 3 Drawing Sheets

(56) References Cited

OTHER PUBLICATIONS

Leon Derczynski, Eric Nichols, Marieke van Erp, and Nut Limsopatham. 2017. Results of the wnut2017 shared task on novel and emerging entity recognition. In Proceedings of the 3rd Workshop on Noisy User-generated Text, pp. 140-147.
Franck Dernoncourt, Ji Young Lee, and Peter Szolovits. 2017a. NeuroNER: an easy-to-use program for named-entity recognition based on neural networks. Conference on Empirical Methods on Natural Language Processing (EMNLP).
Franck Dernoncourt, Ji Young Lee, Ozlem Uzuner, and Peter Szolovits. 2017b. De-identification of patient notes with recurrent neural networks. Journal of the American Medical Informatics Association, 24(3):596-606.
Rezarta Islamaj Dogan, Robert Leaman, and Zhiyong Lu. 2014. Ncbi disease corpus: a resource for disease name recognition and concept normalization. Journal of biomedical informatics, 47:1-10.
Jason Fries, Sen Wu, Alex Ratner, and Christopher Re.' 2017. Swellshark: A generative model for biomedical named entity recognition without labeled data. arXiv preprint arXiv:1704.06360.
Lifu Huang, Jonathan May, Xiaoman Pan, and Heng Ji. 2016. Building a fine-grained entity typing system overnight for a new x (x= language, domain, genre). arXiv preprint arXiv:1603.03112.
Zhiheng Huang, Wei Xu, and Kai Yu. 2015. Bidirectional lstm-crf models for sequence tagging. arXiv preprint arXiv:1508.01991.
Abhyuday N Jagannatha and Hong Yu. 2016. Structured prediction models for rnn based sequence labeling in clinical text. In Proceedings of the Conference on Empirical Methods in Natural Language Processing. Conference on Empirical Methods in Natural Language Processing, vol. 2016, p. 856.
Guoliang Ji, Kang Liu, Shizhu He, and Jun Zhao. 2017. Distant supervision for relation extraction with sentence-level attention and entity descriptions. In Thirty-First AAAI Conference on Artificial Intelligence.
Sun Kim, Rezarta Islamaj Dogan, Andrew ChatrAryamontri, Mike Tyers, W John Wilbur, and Donald C Comeau. 2015. Overview of biocreative v bioc track. In Proceedings of the Fifth BioCreative Challenge Evaluation Workshop, Sevilla, Spain, pp. 1-9.
Guillaume Lample, Miguel Ballesteros, Sandeep Subramanian, Kazuya Kawakami, and Chris Dyer. 2016. Neural architectures for named entity recognition. arXiv preprint arXiv:1603.01360.
Hongtao Lin, Jun Yan, Meng Qu, and Xiang Ren. 2019. Learning dual retrieval module for semi supervised relation extraction. In The World Wide Web Conference, pp. 1073-1083. ACM.
Xuezhe Ma and Eduard Hovy. 2016. End-to-end sequence labeling via bi-directional lstm-cnns-crf. arXiv preprint arXiv:1603.01354.
Yukun Ma, Erik Cambria, and Sa Gao. 2016. Label embedding for zero-shot fine-grained named entity typing. In Proceedings of COLING 2016, the 26th International Conference on Computational Linguistics: Technical Papers, pp. 171-180.
Arjun Magge, Davy Weissenbacher, Abeed Sarker, Matthew Scotch, and Graciela Gonzalez-Hernandez. 2018. Deep neural networks and distant supervision for geographic location mention extraction. Bioinformatics, 34(13):i565-i573.
Mike Mintz, Steven Bills, Rion Snow, and Dan Jurafsky. 2009. Distant supervision for relation extraction without labeled data. In Proceedings of the Joint Conference of the 47th Annual Meeting of the ACL and the 4th International Joint Conference on Natural Language Processing of the AFNLP: vol. 2—vol. 2, pp. 1003-1011. Association for Computational Linguistics.
Maria Pontiki, Dimitris Galanis, Haris Papageorgiou, Ion Androutsopoulos, Suresh Manandhar, ALSmadi Mohammad, Mahmoud Al-Ayyoub, Yanyan Zhao, Bing Qin, Orphee De Clercq, et al. 2016.' Semeval—2016 task 5: Aspect based sentiment analysis. In Proceedings of the 10th international workshop on semantic evaluation (SemEval—2016), pp. 19-30.
Alexander Ratner, Stephen H Bach, Henry Ehrenberg, Jason Fries, Sen Wu, and Christopher Re. 2017. Snorkel: Rapid training data creation with weak supervision. Proceedings of the VLDB Endowment, 11(3):269-282.
Jingbo Shang, Liyuan Liu, Xiang Ren, Xiaotao Gu, Teng Ren, and Jiawei Han. 2018. Learning named entity tagger using domain-specific dictionary. arXiv preprint arXiv:1809.03599.
Vikas Yadav and Steven Bethard. 2018. A survey on recent advances in named entity recognition from deep learning models. In Proceedings of the 27th International Conference on Computational Linguistics, pp. 2145-2158.
Yaosheng Yang, Wenliang Chen, Zhenghua Li, Zhengqiu He, and Min Zhang. 2018. Distantly supervised ner with partial annotation learning and reinforcement learning. In Proceedings of the 27th International Conference on Computational Linguistics, pp. 2159-2169.
Ben Zhou, Daniel Khashabi, Chen-Tse Tsai, and Dan Roth. 2019. Zero-shot open entity typing as type compatible grounding. arXiv preprint arXiv:1907.03228.

* cited by examiner

WEAKLY SUPERVISED SEMANTIC ENTITY RECOGNITION USING GENERAL AND TARGET DOMAIN KNOWLEDGE

Embodiments relate to semantic entity recognition using both general knowledge and target domain knowledge.

BACKGROUND

One goal of semantic entity recognition is to identify entities, concepts, or terminologies, such as function names or signal names, in documents. Recognizing these semantic entities is an important step towards extracting structured information from unstructured text data.

Many methods exist that utilize named entity recognition (such as Person, Location, and Organization) in a general domain. However, the performance of these methods is highly dependent on a large amount of manually labeled data. In many scenarios, there is insufficient or even no manually labeled data for training a domain-specific semantic entity recognition system, which makes it challenging to apply existing methods to recognizing domain specific entities.

SUMMARY

Therefore, among other objects, one object of some embodiments is to perform semantic entity recognition without relying on manually labeled data, but rather only general domain knowledge and domain-specific expert knowledge.

One embodiment provides a system for performing semantic entity recognition. The system includes a general knowledge data repository, a domain-specific expert knowledge data repository, and an electronic processor. The electronic processor is configured to access a document stored in a memory, select, from the general knowledge data repository, target domain information based on a specified target domain; generate a plurality of weak annotators for the document based upon the selected target domain information and expert knowledge from the domain-specific expert knowledge data repository; apply the plurality of weak annotators to the document to generate a plurality of weak labels; select at least one weak label from the plurality of weak labels as training data; and train a semantic entity prediction model using the training data.

Another embodiment provides a method for performing semantic entity recognition. The method includes accessing, with an electronic processor, a document stored in a memory; selecting, with the electronic processor, from a general knowledge data repository, target domain information based on a specified target domain; generating, with the electronic processor, a plurality of weak annotators for the document based upon the selected target domain information and expert knowledge from a domain-specific expert knowledge data repository; applying, with the electronic processor, the plurality of weak annotators to the document to generate a plurality of weak labels; selecting, with the electronic processor, at least one weak label from the plurality of weak labels as training data; and training, with the electronic processor, a semantic entity prediction model using the training data.

Another embodiment provides a non-transitory, computer-readable medium containing instructions that, when executed by an electronic processor, are configured to perform a set of functions, the set of functions including accessing a document stored in a memory; selecting from a general knowledge data repository, target domain information based on a specified target domain; generating a plurality of weak annotators for the document based upon the selected target domain information and expert knowledge from a domain-specific expert knowledge data repository; applying the plurality of weak annotators to the document to generate a plurality of weak labels; selecting at least one weak label from the plurality of weak labels as training data; and training a semantic entity prediction model using the training data.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
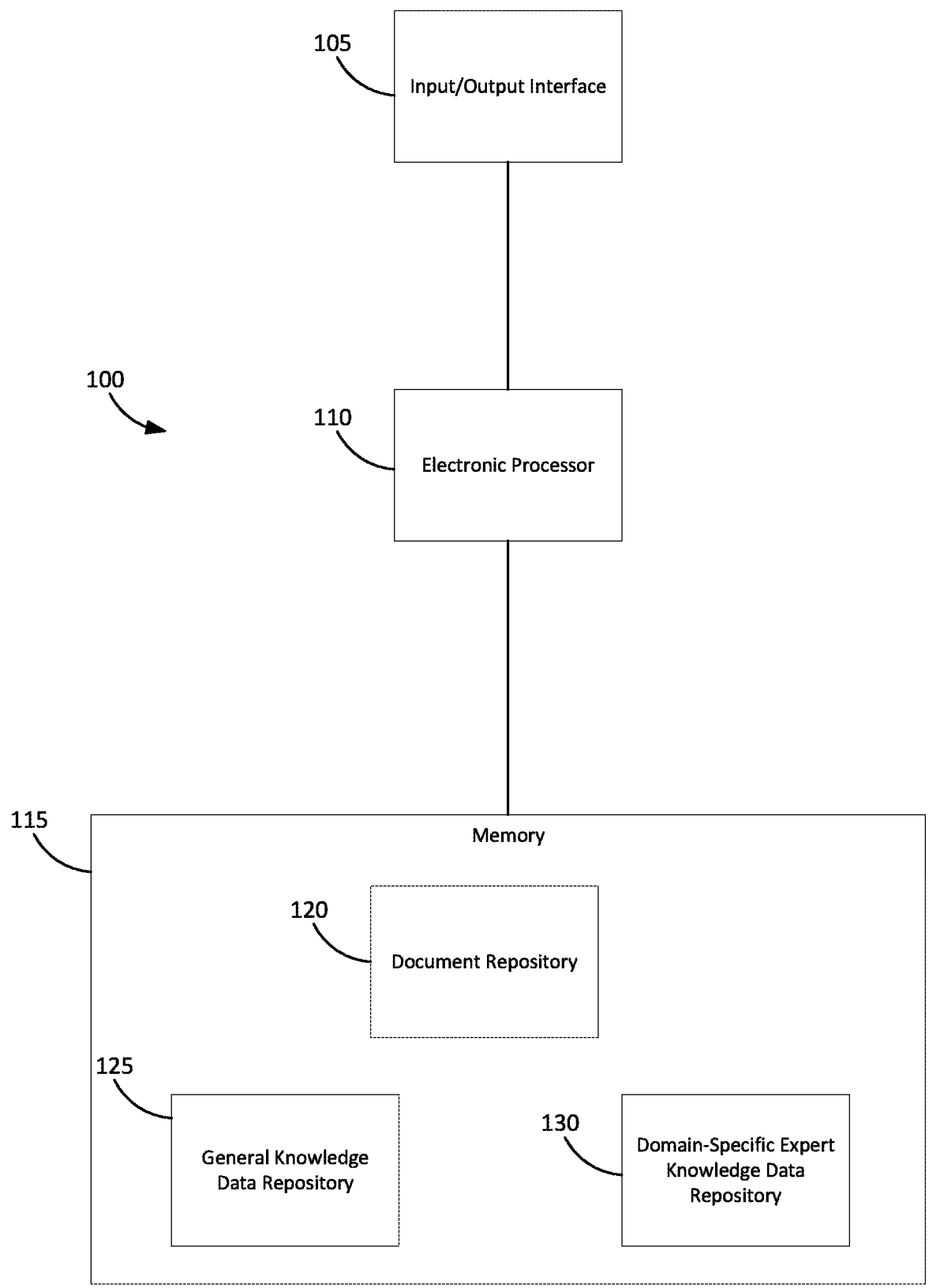
FIG. 1 illustrates a system for performing semantic entity recognition according to one embodiment.

FIG. 1 illustrates a system 100 for performing semantic entity recognition according to one embodiment. The system 100 includes an input/output interface 105, an electronic processor 11, and a memory 115. The input/output interface 105 allows the system 100 to communicate with other computing systems or electronic devices via a wired communication connection or a wireless communication connection. The input/output interface 105 may also include a human/machine interface that allows a user to access and operate the system 100. The electronic processor 110 is configured to, among other things, perform the methods and functions described below.

The memory 115 is a non-transitory, computer-readable medium that stores instructions for execution by the electronic processor 110 that, among other things, cause the electronic processor 110 to perform the methods and functions described below. The memory 115 also includes a document repository 120, a general knowledge data repository 125, and a domain-specific expert knowledge data repository 130.

The document repository 120 stores one or more electronic documents and metadata associated with each of the one or more electronic documents. The electronic documents may be, for example, text documents, Portable Document Format ("PDF") documents, or other documents containing text that is readable by the electronic processor 110. The metadata associated with each electronic document may include a date and time created, an author, or a domain associated with the document. For example, the domain may be "software functions" or "electrical signal names" or some other domain.

The general knowledge data repository 125 includes a number of open-source, general knowledge databases that are accessible to the public. For example, online encyclopedias and other knowledge bases, such as Wikipedia™ or Freebase™, constitute the general knowledge data repository 125.

The domain-specific expert knowledge data repository 130 includes knowledge bases where experts in various domains have input knowledge that is not available in general knowledge databases. By allowing experts to input their knowledge into these specific domain databases, semantic entities that are not available in general knowledge bases can be used to both identify unique entities, such as particular signal or function names for particular programs or companies, and also focus what general knowledge from the general knowledge bases will be used to identify semantic entities in the document.

It is to be understood that the document repository 120, the general knowledge data repository 125, and the domain-specific expert knowledge data repository 130 may be stored on memories separate from the memory 115. For example, the general knowledge data repository 125 may be stored on a server or other remote memory location, and may be accessed by the electronic processor 110 via the input/output interface 105 and one or more wired or wireless communication means.

Figure 2:
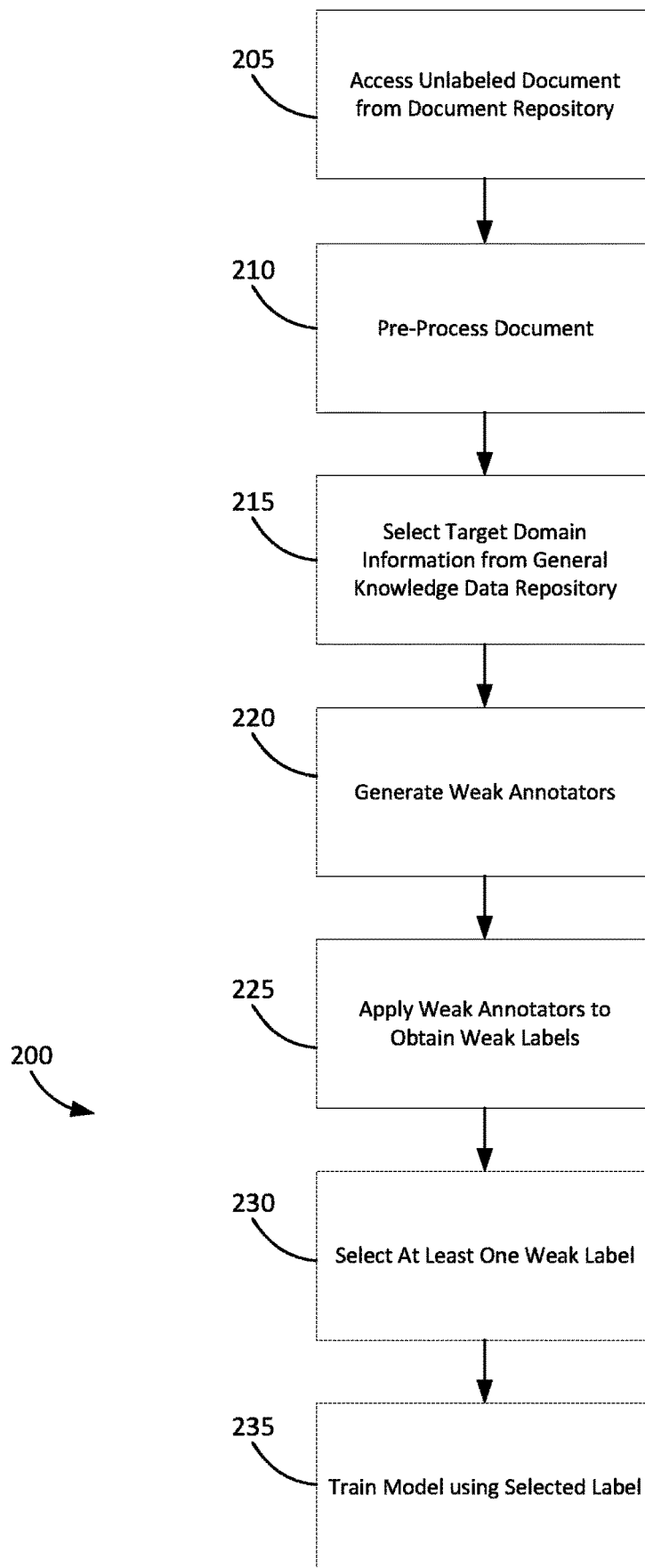
FIG. 2 illustrates a method for performing semantic entity recognition according to one embodiment.

FIG. 2 illustrates a method 200 performing semantic entity recognition according to one embodiment. The method 200 includes accessing, with the electronic processor 110, a document from the document repository 120 in the memory 115 (block 205). The method 200 also includes pre-processing the selected document (block 210). Pre-processing the document cleans the document of unreadable or unprocessable text, removing corrupt or inaccurate text, and generally preparing the document for processing by a machine learning model. For example, in some applications, pre-processing includes fixing typographical errors in the text, fixing grammatical errors in the text, removing unreadable symbols or equations from the text, and other tasks. The output of the pre-processing is an unlabeled data set that is, as explained in greater detail below, used in additional processing. In some embodiments, the pre-processing also includes generating a plurality of possible semantic entities (e.g., a list of possible semantic entities) based on the unlabeled data set.

The method 200 also includes selecting target domain information from the general knowledge data repository 125 based upon a specified target domain (block 215). As discussed above, the general knowledge data repository 125 contains general knowledge about a wide variety of subjects. By selecting target domain information from the general knowledge data repository 125, processing time can be reduced and processing accuracy can be improved, as the amount of knowledge being used to process the document is focused down to only knowledge necessary for processing the document, and not the entirety of the general knowledge data repository 125.

The target domain information selected, in some embodiments, is based upon a domain of the selected document. For example, if the selected document is a document containing computer code with function names, target domain information from the general knowledge data repository 125 may be selected such that the target domain information includes various function naming conventions, particular grammatical and semantic rules for different programming languages, and the like.

The method also includes generating, with the electronic processor 110, a plurality of weak annotators for the document based on the selected target domain information and expert knowledge from the domain-specific expert knowledge data repository 130 (block 220). Instead of a user or human operator manually annotating the document with labels, the electronic processor 110 is configured to automatically generate annotators for the selected document based upon the specified target domain information (from the general knowledge data repository 125) and expert knowledge from the domain-specific expert knowledge data repository 130. For example, the weak annotators for a document containing computer code may identify function names, class names, object names, particular syntax for a programming language, and other unique characteristics of the document.

These annotators are then applied, by the electronic processor 110, to the unlabeled data set of the document to generate a set of weak labels for the document (block 225). In other words, the annotators identify possible semantic entities and label them with a tag or other meaningful label for later processing. In one example, the weak annotators may identify possible function names, such as "main_function" and "example_function" and label them in the document. This creates a plurality of weak labels identifying possible semantic entities in the document. The labels are "weak" labels because the labels identify likely semantic entities instead of being manually assigned by a user. The labels are lower quality (e.g., less likely to be accurate) than manual labels, but are more efficient because a larger number of possible semantic entities can be identified in a much shorter amount of time.

The method 200 also includes selecting at least one of the generated weak labels from the plurality of weak labels to use as training data (block 230). For example, if a label corresponds highly with an annotator (e.g., matches exactly with semantics of a programming language for a function name), the label is selected to train a machine learning model. In some embodiments, an accuracy score for each label is generated. The accuracy score indicates how likely it is that a labeled portion of the document is a semantic entity. The electronic processor 110 may be configured to select the most accurate label(s) to use as training data for a machine learning model. In some embodiments, more than one label is selected to train a machine learning model.

In some embodiments, one or more weak labels are combined or merged and then used to train a machine learning model. For example, if the same function name appears multiple times in a document, each of those labels may be combined or merged, which indicates that it is more likely that the identified function name is a semantic entity. By combining the labels, it is more likely that semantic entities are correctly identified.

Once one or more labels are identified as training data, a semantic entity recognition model is trained using the identified training data (block 235). The semantic entity recognition model may be any machine learning model adequate for semantic entity recognition, such as a deep learning neural network configured to perform named entity recognition. By using the training data generated from the weak labels, no manual labeling of data is required, greatly decreasing the time and effort needed to create the training data for systems as they currently exist in the art. After the model is trained, it can be used to recognize semantic entities within the target domain.

Figure 3:
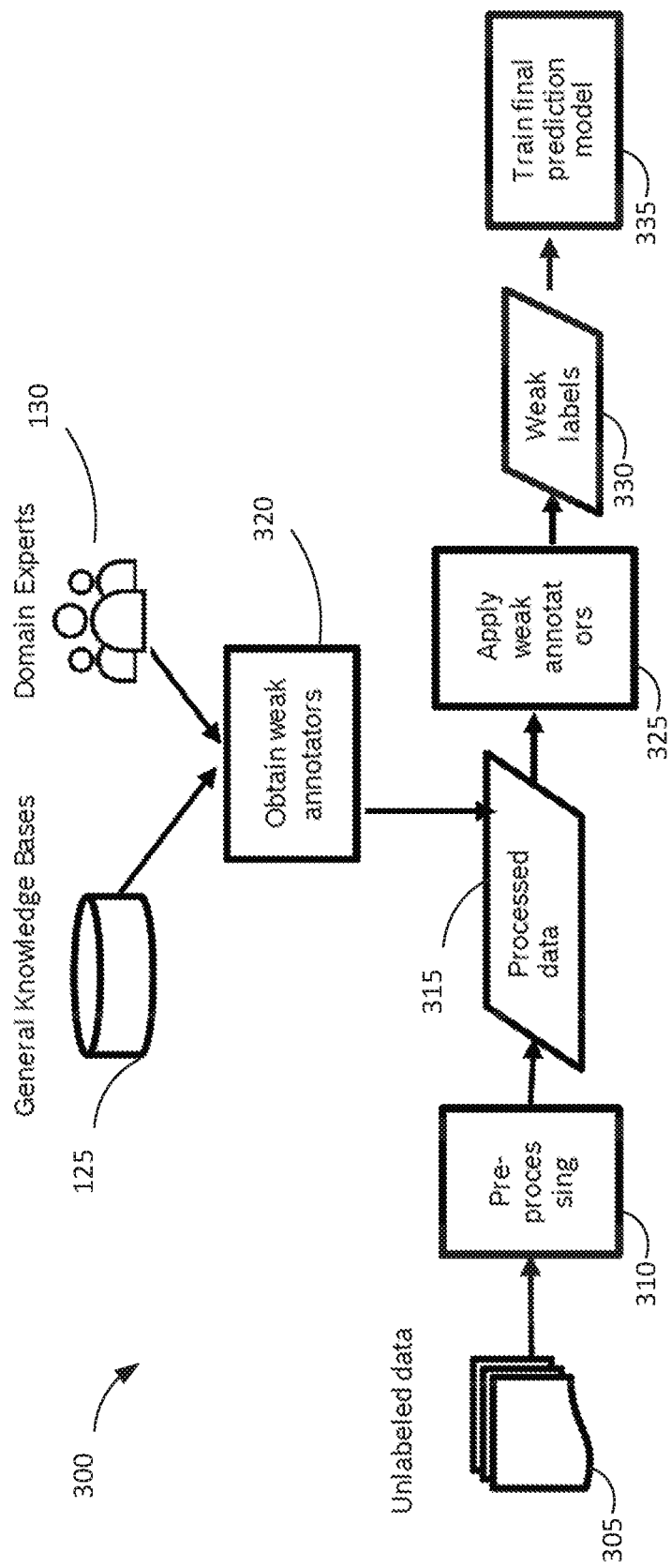
FIG. 3 illustrates an example implementation of a semantic entity recognition system according to one embodiment.

An example system 300 implementing a number of the techniques and concepts described above is illustrated in FIG. 3. The system 300 includes the general knowledge data repository 125 and the domain-specific expert knowledge data repository 130. In particular, the general knowledge data repository 125 is accessed for a selected target domain. A plurality of weak annotators a plurality of weak annotators 320 based on the selected target domain information and expert knowledge.

Unlabeled data 305, for example, one or more documents, is accessed from the document repository 120 and then pre-processed (block 310) as described above to produce processed data 315. The system 300 applies the weak annotators (block 320) to the processed data 315 (block 325) to produce a document labeled with the plurality of weak labels (block 330). The plurality of weak labels is then used to train the final semantic entity recognition prediction model (block 335).

The following examples illustrate example systems and methods described herein.

EXAMPLE 1 a system for performing semantic entity recognition, the system comprising a general knowledge data repository, a domain-specific expert knowledge data repository, and an electronic processor configured to access a document stored in a memory; select, from the general knowledge data repository, target domain information based on a specified target domain; generate a plurality of weak annotators for the document based upon the selected target domain information and expert knowledge from the domain-specific expert knowledge data repository; apply the plurality of weak annotators to the document to generate a plurality of weak labels; select at least one weak label from the plurality of weak labels as training data; and train a semantic entity prediction model using the training data.

EXAMPLE 2 the system of example 1, wherein the electronic processor is further configured to pre-process the document to generate an unlabeled data set.

EXAMPLE 3 the system of example 2, wherein a plurality of potential semantic entities is generated using the unlabeled data set.

EXAMPLE 4 the system of any of examples 1-3, wherein the specified target domain is associated with a domain of the document.

EXAMPLE 5 the system of any of examples 1-4, wherein the electronic processor is further configured to combine at least two weak labels of the plurality of weak labels to generate the training data.

EXAMPLE 6 the system of example 5, wherein each of the plurality of weak labels is combined to generate the training data.

EXAMPLE 7 the system of any of examples 1-6, wherein the semantic entity prediction model is a machine learning model.

EXAMPLE 8 a method for performing semantic entity recognition, the method comprising accessing, with an electronic processor, a document stored in a memory; selecting, with the electronic processor, from a general knowledge data repository, target domain information based on a specified target domain; generating, with the electronic processor, a plurality of weak annotators for the document based upon the selected target domain information and expert knowledge from a domain-specific expert knowledge data repository; applying, with the electronic processor, the plurality of weak annotators to the document to generate a plurality of weak labels; selecting, with the electronic processor, at least one weak label from the plurality of weak labels as training data; and training, with the electronic processor, a semantic entity prediction model using the training data.

EXAMPLE 9 the method of example 8, further comprising pre-processing, with the electronic processor, the document to generate an unlabeled data set.

EXAMPLE 10 the method of example 9, wherein a plurality of potential semantic entities is generated using the unlabeled data set.

EXAMPLE 11 the method of any of examples 8-10, wherein the specified target domain is associated with a domain of the document.

EXAMPLE 12 the method of claim any of examples 8-11, further including combining, with the electronic processor, at least two weak labels of the plurality of weak labels to generate the training data.

EXAMPLE 13 the method of example 12, wherein each of the plurality of weak labels is combined to generate the training data.

EXAMPLE 14 the method of example 8, wherein the semantic entity prediction model is a machine learning model.

EXAMPLE 15 a non-transitory, computer-readable medium containing instructions that, when executed by an electronic processor, are configured to perform a set of functions, the set of functions including accessing a document stored in a memory; selecting from a general knowledge data repository, target domain information based on a specified target domain; generating a plurality of weak annotators for the document based upon the selected target domain information and expert knowledge from a domain-specific expert knowledge data repository; applying the plurality of weak annotators to the document to generate a plurality of weak labels; selecting at least one weak label from the plurality of weak labels as training data; and training a semantic entity prediction model using the training data.

EXAMPLE 16 the non-transitory, computer readable medium of example 15, wherein the set of functions further includes pre-processing the document to generate an unlabeled data set.

EXAMPLE 17 the non-transitory, computer-readable medium of example 16, wherein a plurality of potential semantic entities is generated using the unlabeled data set.

EXAMPLE 18 the non-transitory, computer readable medium of any of examples 15-17, wherein the set of functions further includes combining at least two weak labels of the plurality of weak labels to generate the training data.

EXAMPLE 19 the non-transitory, computer readable medium of example 18, wherein each of the plurality of weak labels is combined to generate the training data

EXAMPLE 20 the non-transitory, computer readable medium of any of examples 15-19, wherein the semantic entity prediction model is a machine learning model.

Thus, embodiments described herein provide, among other things, systems and methods for. Various features, advantages, and embodiments are set forth in the following claims.

What is claimed is:

1. A system for performing semantic entity recognition, the system comprising
   a general knowledge data repository,
   a domain-specific expert knowledge data repository, and
   an electronic processor configured to
      access a document stored in a memory;
      select, from the general knowledge data repository, target domain information based on a specified target domain;
      generate a plurality of weak annotators for the document based upon the selected target domain information and expert knowledge from the domain-specific expert knowledge data repository;
      apply the plurality of weak annotators to the document to generate a plurality of weak labels;
      select at least one weak label from the plurality of weak labels as training data; and
      train a semantic entity prediction model using the training data.

2. The system of claim 1, wherein the electronic processor is further configured to pre-process the document to generate an unlabeled data set.

3. The system of claim 2, wherein a plurality of potential semantic entities is generated using the unlabeled data set.

4. The system of claim 1, wherein the specified target domain is associated with a domain of the document.

5. The system of claim 1, wherein the electronic processor is further configured to combine at least two weak labels of the plurality of weak labels to generate the training data.

6. The system of claim 5, wherein each of the plurality of weak labels is combined to generate the training data.

7. The system of claim 1, wherein the semantic entity prediction model is a machine learning model.

8. A method for performing semantic entity recognition, the method comprising
   accessing, with an electronic processor, a document stored in a memory;
   selecting, with the electronic processor, from a general knowledge data repository, target domain information based on a specified target domain;
   generating, with the electronic processor, a plurality of weak annotators for the document based upon the selected target domain information and expert knowledge from a domain-specific expert knowledge data repository;
   applying, with the electronic processor, the plurality of weak annotators to the document to generate a plurality of weak labels;

selecting, with the electronic processor, at least one weak label from the plurality of weak labels as training data; and training, with the electronic processor, a semantic entity prediction model using the training data.

9. The method of claim 8, further comprising pre-processing, with the electronic processor, the document to generate an unlabeled data set.

10. The method of claim 9, wherein a plurality of potential semantic entities is generated using the unlabeled data set.

11. The method of claim 8, wherein the specified target domain is associated with a domain of the document.

12. The method of claim 8, further including combining, with the electronic processor, at least two weak labels of the plurality of weak labels to generate the training data.

13. The method of claim 12, wherein each of the plurality of weak labels is combined to generate the training data.

14. The method of claim 8, wherein the semantic entity prediction model is a machine learning model.

15. A non-transitory, computer-readable medium containing instructions that, when executed by an electronic processor, are configured to perform a set of functions, the set of functions including accessing a document stored in a memory;

selecting from a general knowledge data repository, target domain information based on a specified target domain;

generating a plurality of weak annotators for the document based upon the selected target domain information and expert knowledge from a domain-specific expert knowledge data repository;

applying the plurality of weak annotators to the document to generate a plurality of weak labels;

selecting at least one weak label from the plurality of weak labels as training data; and training a semantic entity prediction model using the training data.

16. The non-transitory, computer readable medium of claim 15, wherein the set of functions further includes pre-processing the document to generate an unlabeled data set.

17. The non-transitory, computer-readable medium of claim 16, wherein a plurality of potential semantic entities is generated using the unlabeled data set.

18. The non-transitory, computer readable medium of claim 15, wherein the set of functions further includes combining at least two weak labels of the plurality of weak labels to generate the training data.

19. The non-transitory, computer readable medium of claim 18, wherein each of the plurality of weak labels is combined to generate the training data.

20. The non-transitory, computer readable medium of claim 15, wherein the semantic entity prediction model is a machine learning model.

\* \* \* \* \*